United States Patent [19]

Barron

[11] Patent Number: 4,894,405
[45] Date of Patent: Jan. 16, 1990

[54] CONCRETE AND MASONRY WATERPROOFING COMPOSITION

[75] Inventor: Larry R. Barron, Mentor, Ohio

[73] Assignee: Tremco Incorporated, Cleveland, Ohio

[21] Appl. No.: 276,004

[22] Filed: Nov. 25, 1988

[51] Int. Cl.$^4$ .............................................. C08L 75/04
[52] U.S. Cl. .................................. 524/265; 252/182.2; 428/425.5
[58] Field of Search .......................... 524/265, 730; 252/182.2; 428/425.5

[56] References Cited

U.S. PATENT DOCUMENTS

| | | | |
|---|---|---|---|
| 2,901,337 | 8/1959 | Keutgen et al. | 51/298 |
| 3,772,065 | 11/1973 | Seller | 106/2 |
| 3,819,400 | 6/1974 | Plankl et al. | 117/54 |
| 3,879,206 | 4/1975 | Nestler et al. | 106/12 |
| 3,980,597 | 9/1976 | Shihadeh | 260/28 R |
| 3,994,735 | 11/1976 | Ishihara et al. | 106/14 |
| 4,362,430 | 12/1982 | Ceintrey | 404/68 |
| 4,439,070 | 3/1984 | Dimmick | 405/216 |
| 4,442,245 | 4/1984 | Weiss et al. | 523/401 |
| 4,489,176 | 12/1984 | Kluth et al. | 521/144 |
| 4,567,230 | 1/1986 | Meyer et al. | 524/786 |

Primary Examiner—Maurice J. Welsh
Attorney, Agent, or Firm—James R. Lindsay; Daniel J. Hudak; Nestor W. Shust

[57] ABSTRACT

A concrete and masonry waterproofing composition comprises a major amount of a polyurethane and a minor amount of a penetrant. The polyurethane is desirably made from a polyether polyol or a polyester polyol intermediate, wherein the polyol is a diol or a triol. Such intermediates are reacted with a polyisocyanate. Cure, that is, chain extension occurs upon contact with moisture in the air. The penetrant is an organosilane having the formula:

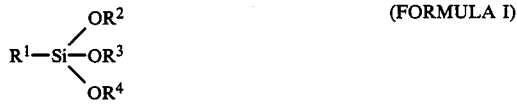

(FORMULA I)

where $R^1$ is an aliphatic having from 1 to 18 carbon atoms and wherein $R^2$, $R^3$, and $R^4$, independently, is an alkyl having from 1 to 6 carbon atoms, or an organosiloxane having the formula:

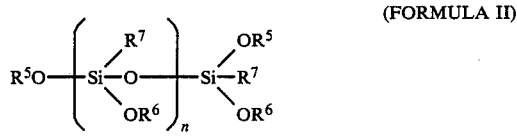

(FORMULA II)

wherein $R^7$ is an aliphatic having from 1 to 18 carbon atoms and $R^5$ and $R^6$, independently, is an alkyl having from 1 to 6 carbon atoms, and wherein n is 2 to 20. Improved results are obtained when the composition is applied to masonry or concrete in that water absorption is much lower than that obtained with either solely a polyurethane coating or solely a penetrant, and application ease is improved in that a single coating is used to both penetrate and seal.

20 Claims, No Drawings

CONCRETE AND MASONRY WATERPROOFING COMPOSITION

FIELD OF THE INVENTION

The present invention relates to a waterproofing composition to protect the porous surfaces of concrete and other masonry surfaces, especially against attack by salt. More specifically, the present invention relates to a waterproofing composition comprising a penetrant, a film forming polyurethane, and a solvent.

BACKGROUND

Numerous concrete and masonry protectants or sealants are known to the prior art. Such protectants or sealants protect the concrete or masonry surfaces from water penetration and thus prevent the intrusion of chloride ions which corrode reinforcement bars and degrade concrete. In cold climates where the water freezes, spalling or deterioration of the concrete or masonry surface is prevented. Sealants or protectants are often applied on substrates such as concrete floors of parking garages or on exterior surfaces of buildings.

Typical prior art protectants are as set forth in the following U.S. Patents:

U.S. Pat. No. 2,901,337 to Keutgen, et al, relates to abrasive articles which are coated and bound together with a heat hardened phenol aldehyde resin.

U.S. Pat. No. 3,772,065 to Seiler relates to a masonry impregnate which is an alcoholic solution of alkyltrialkoxysilanes having up to two alkoxy groups per silicone atom.

U.S. Pat. No. 3,819,400 to Plankl, et al, relates to a waterproofing material which is treated with a silane or a siloxane.

U.S. Pat. No. 3,879,206 to Nestler, et al, relates to a masonry sealant containing an alcoholic or hydrocarbon solution of an alkyltrialkoxysilane or a partial condensation product thereof and an organofunctional silane having a basic organo group or an alcoholate of a metal.

U.S. Pat. No. 3,980,597 to Shihadeh relates to a sealant composition for roofs, etc. composed of a polyurethane composition containing bituminous material which has been dehydrated and chemically neutralized to avoid the formation primarily of a gel and to preclude preliminary curing of the polyurethane polymer.

U.S. Pat. No. 3,994,735 to Ishihara relates to a water repellent coating composition containing a cresol tar.

U.S. Pat. No. 4,362,430 to Ceintrey relates to a polyurethane expansion joint for a concrete roadway and the like.

U.S. Pat. No. 4,439,070 to Dimmick relates to a method of restoring an underwater piling utilizing a jacket.

U.S. Pat. No. 4,442,245 to Weiss, et al, relates to an epoxy resin-diammonium salt emulsion containing a liquid epoxy resin, a latent curing agent, and an emulsifier. The composition is useful in epoxy resin mortars, and for the sealing of concrete surfaces.

U.S. Pat. No. 4,567,230 to Meyer, et al, relates to a single component coating composition containing a major amount of a polyurethane forming isocyanate, a minor amount of an aromatic hydrocarbon resin of low molecular weight containing hydroxyl groups, and the like.

SUMMARY OF THE INVENTION

According to the aspects of the present invention, a two component coating penetrant, that is a concrete and masonry waterproofing composition, comprises a major amount by weight of a polyurethane component and a minor amount by weight of an organosilane and/or an organosiloxane component. The two components are generally applied as a mixture or blend contained in a solvent carrier which is generally a hydrocarbon solvent. The amount of the polyurethane component is generally from about 60 percent to about 95 percent by weight whereas the amount of the organosilane and/or organosiloxane component is generally from about 5 percent to about 40 percent by weight, based upon the total weight of said polyurethane component and said organosilane and/or organosiloxane component. The coating penetrant is generally applied to concrete or masonry surfaces whereby it penetrates the pores and forms a polyurethane film. Water, salt, e.g. chloride ions, ice, etc., are substantially prevented from penetrating the substrate.

DETAILED DESCRIPTION OF THE INVENTION

A concrete and masonry waterproofing composition in the form of a two component coating penetrant is provided in a solvent carrier to prevent general deterioration of the surface of concrete and masonry as from attack from chloride ions as in salt solutions as well as from spalling.

One component of the coating penetrant composition is a urethane polymer. The urethane polymer is generally the reaction product of an intermediate and a polyisocyanate and hence is actually a prepolymer. The coating penetrant composition generally contains a solvent so that upon evaporation thereof, the urethane prepolymer which contains free NCO groups cures through chain extending by reacting with water in air to form a urethane polymer. A stable urea linkage is thus formed.

The intermediate can be a polyether polyol, a polyester polyol, and the like wherein the polyol is a diol, a triol, or a mixture thereof. Such urethane intermediates are well known to the art and to the literature. Specific examples of polyether polyols include polyethylene ether diols or triols, polypropylene ether diols or triols, polybutylene ether diols or triols, polytetramethylene ether diols or triols, and block copolymers of such diols and triols, and/or blends thereof. Specific examples of hydroxy-terminated polyester polyols include any hydroxy-terminated polyester prepared from poly-basic acids or anhydrides as for example adipic acid and phthalic anhydride, and polyols in which the hydroxyl functionality of the polyester prepolymer is 2 or more. The urethane intermediates generally have a molecular weight of from about 400 to about 8,000.

The urethane prepolymers of the present invention are made by reacting the above-noted polyol intermediates with a polyisocyanate generally having the formula $R(NCO)_m$ wherein m is 2, 3 or 4 and R is an aliphatic, an aromatic, or an aliphatic substituted aromatic having from 4 to 20 carbon atoms and preferably from 6 to 15 carbon atoms. The aliphatic groups and especially alkyl groups are preferred. Examples of specific di- or triisocyanates which can be utilized include p,p',p''-triisocyanato triphenyl methane, p,p'-diisocyanate diphenyl methane (MDI), hydrogenated MDI, hexamethylene diisocyanate, naphthalene-1,5-diisocyanate, and various isomers of toluene diisocyanates (TDI) such as 2,4-tolylene diisocyanate, 2,6-tolylene diisocyanate, tetramethylxylene diisocyante, isophorone diisocyanate, hexamethylene diisocyanate, and pentamethylene diisocyanate, and mixtures thereof. The equivalent weight ratio of the polyisocyanate to the polyol intermediate, that is, the NCO/OH ratio is from about 1.8 to about 2.2 and preferably from about 2.0 to about 2.1. The molecular weight of the urethane prepolymer is generally from about 400 to about 8,000. The formation of the prepolymer while occurring at ambient temperature is generally conducted at higher temperatures in order to reduce the reaction time, as at temperatures from about 40° C. to about 125° C. with from about 60° C. to about 100° C. being preferred. The prepolymer formation can be catalyzed using conventional amounts of typical urethane catalysts known to the art and to the literature such as stannous octoate, dibutyltin dilaurate, or various tertiary amines such as triethylene diamine.

The coating penetrant composition of the present invention generally is applied in one step. That is, a one part system is utilized with cure occurring through the reaction of the urethane prepolymer with moisture in the air. Although a one part system is preferred, it is nevertheless to be understood that a two part system can be utilized wherein the curing agent is contained as a separate component, and is added to the coating penetrant system immediately prior to application thereof to a substrate. Conventional two part curing agents can be utilized as known to the art and to the literature such as a polyimine, a dioxazolidine, or a polyol, or combinations thereof.

The penetrant of the present invention is generally an organosilane and/or an organosiloxane. The organosilanes of the present invention have the formula:

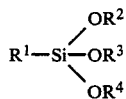

(FORMULA I)

where $R^1$ is an aliphatic, especially an alkyl, having from 1 to 18 carbon atoms and preferably from 1 to 8 carbon atoms. $R^2$, $R^3$, and $R^4$, independently, is an alkyl having from 1 to 6 carbon atoms, with methyl being preferred. Examples of suitable organosilanes include methyl trimethoxysilane, butyl triethoxysilane, and octyl trimethoxysilane.

The organosiloxane generally has the formula:

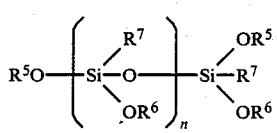

(FORMULA II)

wherein $R^7$ is an aliphatic, desirably an alkyl, having from 1 to 18 carbon atoms and preferably from 1 to 8 carbon atoms. $R^5$ and $R^6$, independently, is an alkyl having from 1 to 6 carbon atoms with methyl being preferred. The number of repeating units, that is "n" is generally from about 2 to about 20, and desirably from about 2 to about 10. Examples of specific organosiloxanes are the various siloxane derivatives of the various silanes listed hereinabove.

The organosilane and/or the organosiloxane generally exists in a minor amount as from about 5 to about 40 percent, desirably from about 5 to about 25 percent, and preferably from about 10 to about 20 percent by weight based upon the total weight of the penetrant component and the polyurethane component. Hence, the amount of the polyurethane component is the remaining percentage, that is from about 60 percent to about 95 percent by weight, desirably from about 75 percent to about 95 percent by weight, and preferably from about 80 to about 90 percent by weight.

Solvent carriers are generally utilized to blend the penetrant and polyurethane so that it can be easily and adequately disbursed or applied to a concrete or a masonry surface. The amount of solvent is generally from about 10 percent to about 99 percent by weight and desirably from about 50 percent to about 80 percent by weight based upon the total weight of the solvent and the two component coating penetrant composition. Generally any type of hydrocarbon solvent can be utilized, so long as it is generally not reactive with the urethane prepolymer. Hence, alcohols are not utilized. Various aliphatic solvents can be utilized such as the alkanes having from 6 to about 10 carbon atoms, e.g., hexane, heptane, nonane, and the like. Other suitable aliphatic solvents include various cycloaliphatic solvents, especially cycloalkanes, having from 4 to about 10 carbon atoms such as cyclohexane, the various ethers such as diethyl ether, the various esters such as ethyl acetate, and the like. Aromatic solvents are generally preferred and specific examples of the same include xylene, toluene, naphtha, and the like.

Although preferably a two component system can be utilized as set forth hereinabove, and hence exists as a clear solution, various additives can be utilized. Such additives are known to the art and to the literature and are utilized in conventional amounts and include plasticizers, pigments, thickeners, fillers, ultraviolet light inhibitors, antioxidants, and the like. Moreover, since the present invention obtains good results utilizing small amounts of expensive silane compounds, a significant reduction in cost to coat a concrete substrate is achieved in comparison to the use of commercial silane penetrates.

The present invention will be better understood by reference to the following examples:

EXAMPLE 1 - PU-A

Desmodur W, methylene bis(4-cyclohexyl isocyanate), 1 equivalent of 133 grams was added to a 1 liter flask under a nitrogen blanket Then 0.5 equivalent of Olin Poly G 36-232, a 750 molecular weight polyoxypropylene triol with less than 0.05 percent $H_2O$ content was added to the flask. The flask was heated to 70° C. The initial percent NCO was found to be 16.4 percent. At 70° C. under agitation, 0.05 ml. of dibutyl tin dilaurate catalyst was added to the reaction. The exotherm was allowed to subside and then the temperature was maintained at 90° C. for one hour. The percent NCO was determined and found to be 8.48 percent. Xylene was added to the reaction to make an 80 percent total solids solution with an NCO of 6.83 percent, and a brookfield viscosity of 19,000 cps. For packaging and application purposes further dilution with xylene was made to 40 percent total solids.

EXAMPLE 2 - PU-B

A polyurethane was prepared as in Example 1 except that one equivalent (87 grams) of an 80/20 mixture of 2,4/2,6-toluene diisocyanate is used instead of Desmodur W. This polymer was also diluted to 40 percent total solids with xylene.

The above polymers were tested as is and in combination with various silane and siloxane additives as concrete protectorants to exclude salt intrusion into concrete. Several different sets of test data were generated as follows.

Four inch concrete cubes were coated with 13 grams of the formulation set forth in Table I. The coated cubes were air dried for 14 days at 77° F. and 50 percent relative humidity and then weighted (initial weight). The cubes were immersed in a 15 percent by weight sodium chloride brine solution for 21 days, subsequently rinsed, dried and weighted.

The gain in weight as compared to uncoated cubes was then determined. The percent reduction in weight gained was determined by the formula $$\% \text{ reduction in weight gained} = 100 - \frac{100 \times \text{wt. gain of coated cube}}{\text{Wt. gain of uncoated cube}}$$

This comparison to uncoated cubes prepared from the same concrete mix is important, as the density and porosity of concrete will vary from mix to mix.

The percent reduction in weight gain is significant for concrete, as it relates to salt penetration. Higher numbers mean more salt is excluded and hence the concrete treatment is better.

A test as outlined above was performed on concrete cubes

PU-A versus a hybrid containing 36 parts PU-A, 4 parts octyl trimethoxy silane, and 60 parts xylene produced the following results:

|  | % Reduction in Weight Gain |
|---|---|
| PU-A 40% solids | 75.2% |
| Hybrid 40% solids | 86.2% |

This test clearly shows the hybrid composition of the present invention to be superior to polyurethane alone.

In a second set of tests the hybrid was compared to the silane alone.

|  | % Reduction in Weight Gain |
|---|---|
| Isobutyltrimethoxy silane 40% isopropanol | 81.4% |
| Hybrid - 36% PU-A/4% Isobutyltrimethoxysilane/60% xylene | 95.0% |

Again, the improvement of the hybrid is quite apparent, and at a significantly lower cost.

A third series of tests was run with various hybrids, urethanes, and silanes as follows:

|  | % Reduction in Weight Gain |
|---|---|
| PU-B from Example 2 | 84.2% |
| The following ratios of PU-A/ Octyl Trimethoxysilane/Xylene |  |
| 36/4/60 | 93.5% |
| 33/7/60 | 92.6% |
| 30/10/60 | 94.0% |
| 20/7/73 | 94.4% |
| The following ratios of PU-A/ BS-69 (a commercial polysiloxane from Wacker)/xylene |  |
| 36/4/60 | 76.8% |
| 33/7/60 | 85.2% |
| 30/10/60 | 86.1% |
| (BS-69)40/60 Xylene | 88.9% |
| Octyltrimethoxysilane-40/60 Xylene | 77.7% |
| Isobutyltrimethoxysilane-40/60 Isopropanol | 85.6% |

Again, the silane hybrids show much improved properties at substantially lower cost. The siloxane hybris are approximately equal to the high concentrations of the silanes and siloxanes alone, but again at substantially lower cost.

All the concrete cubes from the third series above were then sandblasted to remove the coatings and a thin layer of the concrete. The abraded cubes were then re-immersed in the brine solution and the percent reduction in weight gain was again determined.

|  | % Reduction in Weight Gain |
|---|---|
| PU-B | 73.0 |
| PU-A/Octyl Trimethoxysilane/Xylene |  |
| 36/4/60 | 82.5% |
| 33/7/60 | 84.9% |
| 30/10/60 | 82.2% |
| 20/7/73 | 83.9% |
| PU-A/BS-69/xylene |  |
| 36/4/60 | 67.5% |
| 33/7/60 | 71.6% |
| 30/10/60 | 79.1% |
| BS-69 Xylene - 40/60 | 84.6% |
| Octyltrimethoxysilane Xylene 40/60 | 85.3% |
| Isobutyltrimethoxysilane-Isopropanol 40/60 | 82.6 |

The above test shows that even after the coating is abraded away, the low percentage silane hybrids are still essentially equal to the protection from the expensive high solids silane and siloxane penetrants.

These hybrids provide excellent adhesion to concrete which is very difficult to accomplish should the coating and penetrant be applied separately.

While in accordance with the Patent Statutes, a best mode and preferred embodiment has been set forth, the scope of the invention is not limited thereto, but rather by the scope of the attached claims.

What is claimed is:

1. A coating penetrant composition, comprising:
from about 60 percent to about 95 percent by weight of a polyisocyanate terminated polyurethane prepolymer based upon the total weight of said polyurethane prepolymer and a penetrant, from about 5 percent to about 40 percent by weight of a penetrant based upon the total weight of said penetrant and said polyurethane prepolymer, said polyisocyanate terminated polyurethane prepolymer made from the reaction of a polyether polyol intermediate, a polyester polyol intermediate, or combinations thereof, with a polyisocyanate,
said penetrant being an organosilane having the formula:

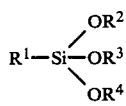

(FORMULA I)

wherein $R^1$ is an aliphatic having from 1 to 18 carbon atoms, wherein $R^2$, $R^3$ and $R^4$, independently, is an alkyl having from 1 to 6 carbon atoms; or an organosiloxane having the formula:

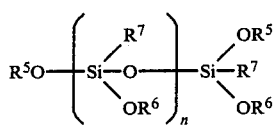

(FORMULA II)

wherein $R^7$ is an aliphatic having from 1 to 18 carbon atoms, and wherein $R^5$ and $R^6$, independently is an alkyl having from 1 to 6 carbon atoms, wherein n is from 2 to 20; or combinations thereof.

2. A coating penetrant composition according to claim 1, including an organic solvent, said organic solvent being non-reactive with said polyurethane prepolymer, wherein the amount of solvent is from about 10 percent to about 99 percent by weight based upon the total weight of said polyurethane prepolmer, said penetrant, and said solvent, wherein said $R^1$ is an alkyl having from 1 to 18 carbon atoms, and wherein said $R^7$ is an alkyl having from 1 to 18 carbon atoms.

3. A coating penetrant composition according to claim 2, wherein the amount of said polyurethane is from about 75 percent to about 95 percent by weight based upon the total weight of said polyurethane prepolymer and said penetrant, and wherein the amount of said penetrant is from about 5 percent to about 25 percent by weight, based upon the total weight of said polyurethane prepolymer and said penetrant, wherein R1 is an alkyl having from 1 to 8 carbon atoms, and wherein said $R^7$ is an alkyl having from 1 to 8 carbon atoms.

4. A coating penetrant composition according to claim 3, wherein the amount of said polyurethane prepolymer is from about 80 percent to about 90 percent by weight based upon the total weight of said polyurethane prepolymer and said penetrant, and wherein the amount of said penetrant is from about 10 percent to about 20 percent by weight based upon the total weight of said polyurethane preopolymer and said penetrant.

5. A coating penetrant composition according to claim 3, wherein said polyisocyanate is a diisocyanate, wherein said $R^2$, $R^3$ and $R^4$ is methyl, and wherein $R^5$ and $R^6$ is methyl, and wherein n is from about 2 to about 10.

6. A concrete or a masonry surface having the coating penetrant composition of claim 1 thereon.

7. A concrete or a masonry surface having the coating penetrant composition of claim 2 thereon.

8. A concrete or a masonry surface having the coating penetrant composition of claim 3 thereon.

9. A concrete or a masonry surface having the coating penetrant composition of claim 4 thereon.

10. A concrete or a masonry surface having the coating penetrant composition of claim 5 thereon.

11. A cured concrete and masonry waterproofing coating having improved absorption resistance comprising:

a major amount by weight of a cured polyurethane and a minor amount by weight of a penetrant, said cured polyurethane formed by the reaction of a polyisocyanate terminated polyurethane prepolymer with moisture in the air, said polyurethane prepolymer made from the reaction of a polyether polyol intermediate, a polyester polyol intermediate, or combinations thereof, with a polyisocyanate having the formula:

$R(NCO)_m$ where R is an aliphatic, an aromatic, or an aliphatic substituted aromatic having from 4 to 20 carbon atoms, and m is 2,3, or 4, said penetrant being an organosilane having the formula:

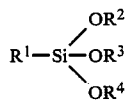

(FORMULA I)

wherein $R^1$ is an aliphatic having from 1 to 18 carbon atoms, wherein $R^2$, $R^3$ and $R^4$, independently, is an alkyl having from 1 to 6 carbon atoms; or an organosiloxane having the formula:

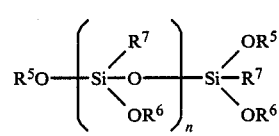

(FORMULA II)

wherein $R^7$ is an aliphatic having from 1 to 18 carbon atoms, and wherein $R^5$ and $R^6$, independently is an alkyl having from 1 to 6 carbon atoms, wherein n is from 2 to 20; or combinations thereof.

12. A cured concrete and masonry waterproofing coating according to claim 11, wherein the amount of said cured polyurethane is from about 60 percent to about 95 percent by weight based upon the total weight of said cured polyurethane and said penetrant, wherein the amount of said penetrant is from about 5 percent to about 40 percent by weight based upon the total weight of said penetrant and said cured polyurethane, wherein said polyurethane prepolymer has a molecular weight of from about 400 to about 8,000, wherein $R^1$ is an alkyl having from 1 to 18 carbon atoms and wherein $R^7$ is an alkyl having from 1 to about 18 carbon atoms.

13. A cured concrete and masonry waterproofing coating according to claim 12, wherein $R^7$ is an alkyl having from 1 to 8 carbon atoms.

14. A cured concrete and masonry waterproofing composition according to claim 13, wherein said polyurethane intermediate is a polyether polyol, wherein m is 2, wherein $R^1$ is an alkyl having from 1 to 8 carbon atoms, wherein the amount of said cured polyurethane is from about 75 percent to about 95 percent by weight based upon the total weight of said cured polyurethane and said penetrant, wherein the amount of said penetrant is from about 5 percent to about 25 percent by weight based upon the total weight of said penetrant and said cured polyurethane, and wherein n is from 2 to about 10.

15. A cured concrete and masonry waterproofing coating according to claim 14, wherein R is an aliphatic having from 6 to 15 carbon atoms, wherein the equivalent ratio of said polyisocyanate to said polyol intermediate is from about 1.8 to about 2.2, wherein $R^2$, $R^3$, and $R^4$ is methyl, and wherein $R^5$ and $R^6$ is methyl.

16. A cured concrete or masonry surface having the cured waterproofing coating of claim 11 thereon.

17. A cured concrete or masonry surface having the cured waterproofing coating of claim 12 thereon.

18. A cured concrete or masonry surface having the cured waterproofing coating of claim 13 thereon.

19. A cured concrete or masonry surface having the cured waterproofing coating of claim 14 thereon.

20. A cured concrete or masonry surface having the cured waterproofing coating of claim 15 thereon.

* * * * *